United States Patent
Ramesh et al.

(10) Patent No.: US 7,386,561 B1
(45) Date of Patent: Jun. 10, 2008

(54) PARTITIONED JOINS OF SPATIAL OBJECTS IN A DATABASE SYSTEM

(75) Inventors: Bhashyam Ramesh, San Diego, CA (US); Michael W. Watzke, Madison, WI (US)

(73) Assignee: NCR Corp., Dayton, OH (US)

( * ) Notice: Subject to any disclaimer, the term of this patent is extended or adjusted under 35 U.S.C. 154(b) by 1084 days.

(21) Appl. No.: 10/068,214

(22) Filed: Feb. 6, 2002

(51) Int. Cl.
    *G06F 17/30* (2006.01)
(52) U.S. Cl. ...................................... 707/102
(58) Field of Classification Search ...... 707/101–104.1, 707/100, 1–10, 200–206; 715/854
    See application file for complete search history.

(56) References Cited

U.S. PATENT DOCUMENTS

| | | | |
|---|---|---|---|
| 5,303,383 A | 4/1994 | Neches et al. ............. | 712/43 |
| 5,640,584 A | 6/1997 | Kandasamy et al. ....... | 712/30 |
| 5,864,842 A | 1/1999 | Pederson et al. .......... | 707/3 |
| 5,884,299 A | 3/1999 | Ramesh et al. ............ | 707/2 |
| 5,905,985 A * | 5/1999 | Malloy et al. ............. | 707/100 |
| 6,205,447 B1 * | 3/2001 | Malloy .................... | 707/102 |
| 6,405,208 B1 * | 6/2002 | Raghavan et al. .......... | 707/102 |
| 6,510,435 B2 * | 1/2003 | Bayer ..................... | 707/100 |
| 6,546,395 B1 * | 4/2003 | DeKimpe et al. .......... | 707/101 |
| 6,606,621 B2 * | 8/2003 | Hopeman et al. .......... | 707/3 |
| 6,651,055 B1 * | 11/2003 | Kilmer et al. ............. | 707/3 |
| 6,684,206 B2 * | 1/2004 | Chen et al. ............... | 707/3 |
| 6,745,205 B2 * | 6/2004 | Choi et al. ............... | 707/104.1 |

OTHER PUBLICATIONS

Oracle Spatial User's Guide and Reference, Indexing and Querying Spatial Data Oracle, 1999-2002, http://www.utexas.edu/its/unix/reference/oracledocs/v92/B10501-01/appdev.920/a96630/sdo, pp. 1-17.*
Jignesh M. Patel et al., Partition Based Spatial-Merge Join, 1996, SIGMOD, NASA Grant, IBM Research ACM, NY NY, pp. 1-12.*
Jignesh M. Patel et al., Clone Join and Shadow Join: Two Parallel Spatial Join Algorithms, 2000, ACM NY NY, pp. 54-61.*
Yanchun Zhang et al., Parallel Algorithms for Spatial Data Partition and Join Processing, 1997, IEEE, , pp. 703-716.*
Volker Gaede, "Geometric Information Makes Spatial Query Processing More Efficient," pp. 1-8, ACM GIS (1995).
Jack Orenstein et al., IEEE Transactions on Software Engineering, vol. 14. No. 5 "PROBE Spatial Data Modeling and Query Processing in an Image Database Application," pp. 611-629 (May 1988).
Volker Gaede, "Optimal Redundancy in Spatial Database Systems," pp. 96-116, Proc. 4$^{th}$ Int. Symposium on Advances in Spatial Databases (1995).

(Continued)

*Primary Examiner*—Diane D Mizrahi
(74) *Attorney, Agent, or Firm*—Trop, Pruner & Hu P.C.; Harden E. Stevens, III

(57) ABSTRACT

A method and apparatus performs a partitioned joins of spatial objects in a database system. In one example arrangement, each spatial object is represented by z-cells in a z-ordered space. The z-cells of certain spatial objects are either duplicated or redistributed across multiple partitions in the database system to enable parallel joins of spatial objects.

29 Claims, 9 Drawing Sheets

OTHER PUBLICATIONS

Jack A. Orenstein et al., "Redundancy in Spatial Databases," pp. 294-305, Proc. ACM SIGMOD Int. Conf. On Management of Data (1989).

Volker Gaede et al., ACM Computing Surveys, vol. 30, No. 2, "Multidimensional Access Methods," pp. 171-231 (Jun. 1998).

Jens-Peter Dittrich et al., "Data Redundancy and Duplicate Detection in Spatial Join Processing," pp. 535-546, ICDE (2000).

Jack A. Orenstein et al., "A Class of Data Structures for Associative Searching," pp. 181-190, Proc. of the Third ACM SIGACT-SIGMOD Symposium on Principles of Data-base Systems (1984).

* cited by examiner

US 7,386,561 B1

PARTITIONED JOINS OF SPATIAL OBJECTS IN A DATABASE SYSTEM

BACKGROUND

A database is a collection of stored data that is logically related and that is accessible by one or more users. A popular type of database is the relational database management system (RDBMS), which includes relational tables made up of rows (or tuples) and columns (or attributes). Each row represents an occurrence of an entity defined by a table, with an entity being a person, place, or thing about which the table contains information.

Data stored in relational tables are accessed to perform various types of operations, such as reads, writes, joins, and so forth. To access data in a relational table, queries according to a standard database query language are issued, such as the Structured Query Language (SQL). One version of SQL is SQL-92, while another version of SQL is SQL-99 (also referred to as SQL-3).

While SQL-92 provides for relatively simple data types (e.g., integers, characters, strings, and so forth), SQL-99 provides for user-defined data types (UDTs). UDTs are customizable to represent relatively complex data, such as spatial data, image data, video data, audio data, and so forth.

There are several different types of spatial data. As examples, geographic applications and graphics design involve two-dimensional data. Geological applications involve three-dimensional data. In certain other applications, representation in four dimensions is needed, such as the representation of moving three-dimensional objects.

A challenge that has faced developers of database systems is performing spatial joins of spatial objects stored in a database system. Various techniques have been developed, with one example technique based on z-ordering. Z-ordering approximates a given object geometry by recursively decomposing a data space into smaller subspaces, referred to as z-regions or z-cells. Z-ordering allows multiple resolution levels where a single spatial object can be composed of z-regions of varying resolution. Also, sets of spatial objects can be composed of regions of varying resolution. This enables the ability to efficiently manage sets of spatial objects of varying size.

Conventionally, techniques have generally not been developed to enable the efficient processing (e.g., joins) of spatial objects in relatively large database systems that are capable of storing large amounts of data (e.g., hundreds of gigabytes or multiples of terabytes).

SUMMARY

In general, an improved method and apparatus is provided for performing joins of spatial objects in a partitioned environment. For example, a method for use in a database system includes storing plural tables each containing spatial objects (representing the spatial objects using z-ordering in one example). The spatial objects are divided across plural partitions, and a join of the spatial objects in the plural tables in the plural partitions is performed in parallel.

Other or alternative features will become apparent from the following description, from the claims, and from the drawings.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
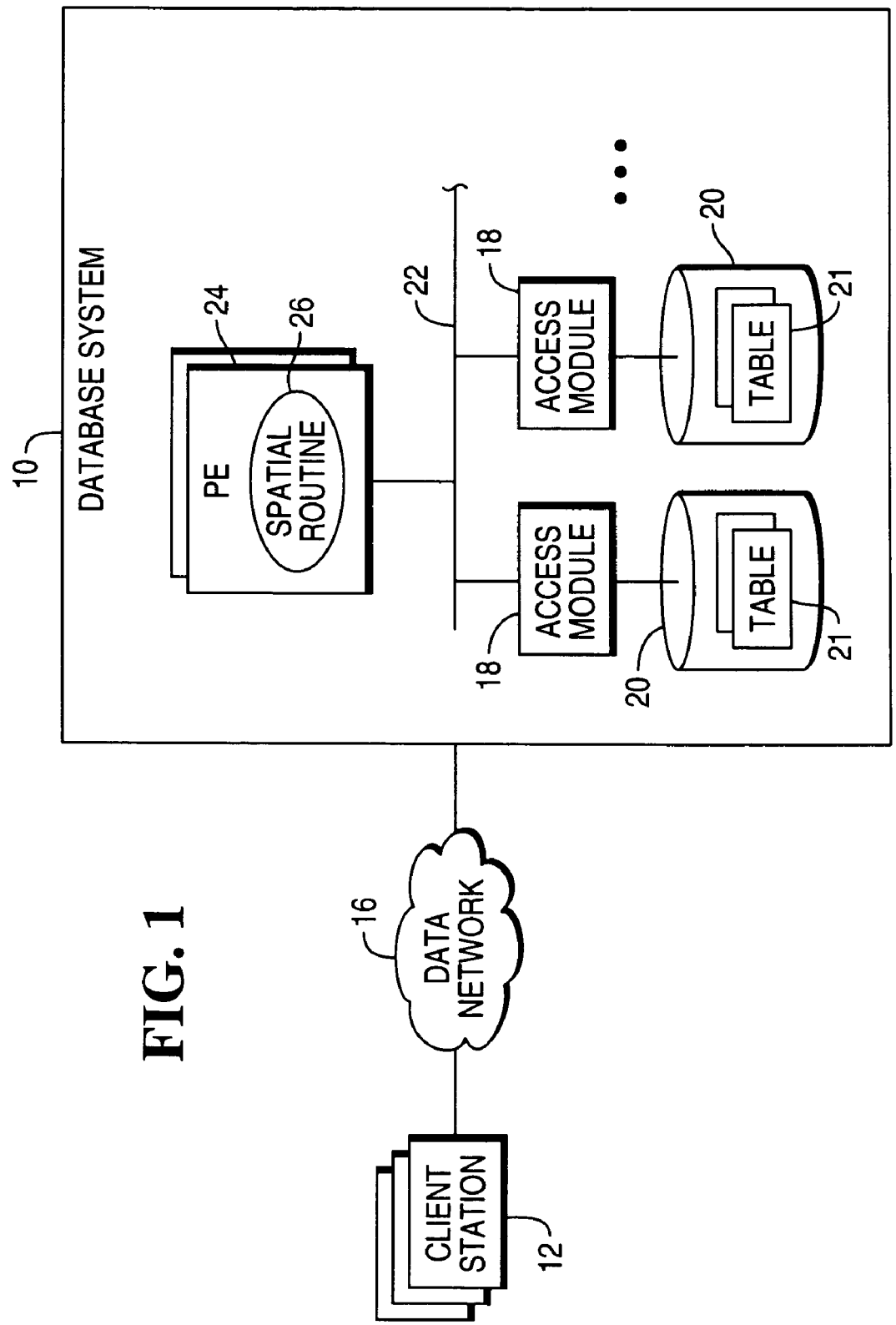
FIG. 1 is a block diagram of an example arrangement of a database system and one or more client stations coupled to the database system.

FIG. 1 shows a database system 10 that is coupled to one or more client stations 12 over a data network 16. Examples of the data network 16 include a private network, such as a local area network (LAN) or a wide area network (WAN), or a public network such as the Internet. The one or more client stations 12 are able to issue queries (according to a standard database query language) to the database system 10 over the data network 16. One example standard database query language is the Structured Query Language (SQL), which is provided by the American National Standards Institute (ANSI), with one version being the SQL-99 Standard (also referred to as the SQL-3 Standard).

Although reference is made to SQL-99 in this description, other embodiments can employ other types of standard database query languages that provide for the ability to store spatial objects. For example, SQL-99 provides for user-defined data types (UDTs) that can be created by a user, an application, a database management system, or another standard (other than the database query language standard) to store spatial objects. Note that a data type for storing spatial objects does not need to be a UDT, as certain database systems may have predefined or built-in data types for storing spatial data.

The database system 10 includes a plurality of access modules 18. Each access module 18 manages access of data stored in a respective storage module 20. In one embodiment, the access modules 18 include access modules processors (AMPs) in TERADATA® database systems from NCR Corporation. Although shown as discrete components, the storage modules 20 can be part of the same storage subsystem, with the storage modules 20 representing different portions of the storage subsystem. In another embodiment, each storage module 20 can represent a different physical storage device or group of devices.

As shown, relational tables 21 are stored in the storage modules 20, with each table distributed across the multiple storage modules 20 and respective access modules 18. The access modules 18 are coupled together by an interconnect layer 22, which is also coupled to a parsing engine 24 (or plural parsing engines). The parsing engine 24 interprets a query, such as one received from a client station 12, checks the query for proper SQL syntax, and sends out executable actions to be performed by the access modules 18.

The access modules 18 are capable of concurrently accessing data stored in respective portions of each table 21. Concurrency is important for efficient data management in a database system storing relatively large amounts of data (e.g., hundreds of gigabytes or multiples of terabytes of data). The database system 10 shown in FIG. 1 is an example of a parallel database system.

In one embodiment, the access modules 18 and parsing engine 24 are software modules that are executable in the database system 10. Such software modules are executable in one or more physical nodes in the database system 10. One node can include a single access module 18, or alternatively, multiple access modules 18.

As further shown in FIG. 1, a spatial routine 26 is part of the parsing engine 24. Although not shown, a part of the spatial routine 26 is also in the access modules 18. Thus, although referred to in the singular sense, the spatial routine 26 can actually be implemented as plural routines or modules. Alternatively, the spatial routine 26 is separate from, but accessible, by the parsing engine 24. The spatial routine 26 manages the creation of the spatial objects as well as the partitioned join of spatial objects across the multiple access modules 18 of the database system 10. Although only one spatial routine 26 is shown, there may be multiple spatial routines 26 that run in parallel. In one embodiment, the spatial routine 26 decomposes spatial objects according to a z-ordering algorithm for storage in the tables 21 in the database system 10. The spatial routine 26 performs joins of spatial objects based on z-ordering. Because the database system 10 is a parallel database system, including multiple access modules 18 that are capable of concurrently accessing contents of tables in multiple storage modules 20, the z-ordered join is performed in a partitioned execution environment. The join is partitioned across multiple access modules 18, which concurrently perform the z-ordered join of spatial objects in two or more tables. This is also referred to as performing the join "in parallel."

Figure 2:
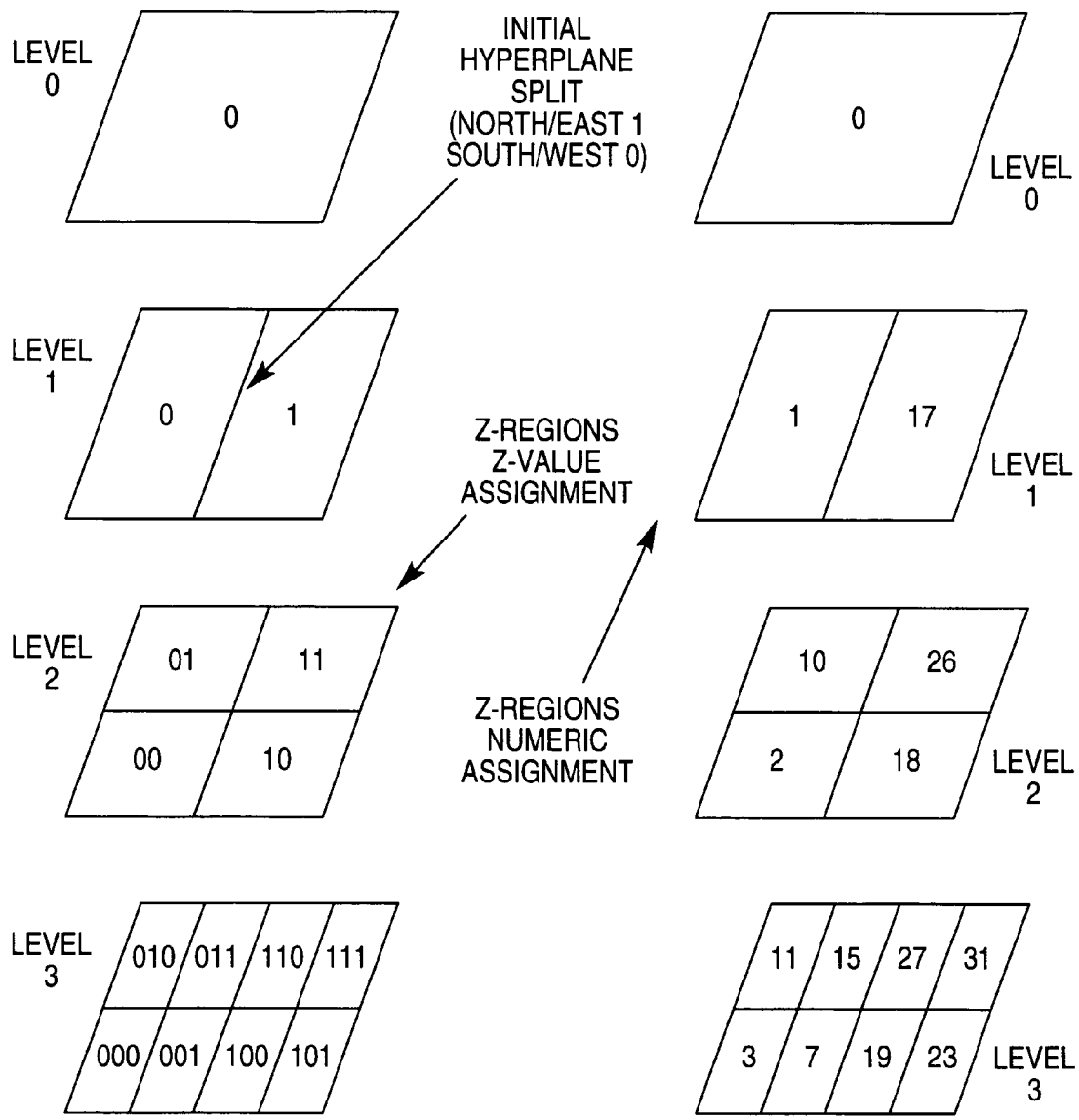
FIGS. 2 and 3 illustrate representing spaces and objects in z-ordered space according to z-ordering.

The concept of z-ordering is explained in conjunction with FIG. 2, which shows multiple z-levels of z-regions or z-cells. The terms "z-region" and "z-cell" are used interchangeably throughout this discussion. Z-level 0 is the upper-most z-level. The space at z-level 0 is divided into an arbitrary granularity using a recursive decomposition process. The subdivisions of space are referred to as z-regions or z-cells. Each z-region in space is assigned a z-value. FIG. 2 shows z-ordering applied to two-dimensional objects. Other embodiments of the invention can be applied to three- or four-dimensional objects.

Starting with a given spatial object (e.g., a map representing a region of the world), the spatial object is decomposed into z-regions. Thus, as shown in FIG. 2, the space at z-level 0 is divided into two halves along an axis (referred to as a hyperplane). Z-ordering decomposition works as follows: Starting with the complete data space, z-regions are computed by splitting the respective data space along hyperplanes (e.g., one of a vertical axis and horizontal axis). The z-regions are iteratively split until a termination criterion is met. After every split, a z-region in which a spatial object is found is further analyzed. In case a hyperplane intersects a geometry, the geometry is split along the hyperplane and the z-ordering decomposition proceeds recursively with the two resulting sub-geometries and their corresponding subspaces until completion. As a net result of the decomposition, the extended object geometry is approximated with many z-regions possibly of different sizes. Thus, z-ordering allows a single spatial object to be composed of z-regions of varying resolutions (that is, at different z-levels).

A relational table has multiple rows, each capable of storing a spatial object. The number of z-regions and the corresponding z-levels(s) used to represent each spatial object depends on the specific characteristic of the spatial object. As a result, it is possible for plural spatial objects to be represented by z-regions at different z-levels. For example, a first spatial object of table A can be represented by z-regions at z-level 1, a second spatial object of table A can be represented by z-regions at z-level 2, and so forth. Thus, for a spatial object in a given row, multiple z-regions or z-cells can be assigned to represent the spatial object (referred to as "multiple assignment"). In fact, a spatial object can be represented by multiple z-regions at more than one z-level.

Depending on the location of a subspace relative to a splitting hyperplane, a "0" or a "1" is appended to the splitting sequence referred to as the z-value. Thus, as shown in FIG. 2, the z-region at z-level 0 has a z-value of "0". At z-level 1, after the split into two z-regions, the z-region on the left side of the splitting hyperplane is assigned a z-value "0", while the z-region on the right of the splitting hyperplane is assigned a value "1". Next, z-regions at z-level 1 are split by a hyperplane that is parallel to a horizontal axis. Again a "0" or "1" value is appended to the z-value. In this example, a "0" is appended to the z-value for the two lower z-regions, while a "1" is appended to the z-values for the upper z-regions at z-level 2. The left-lower z-region is assigned z-value "00" (as a result of appending a "0" to the base z-value "0"), and the right lower z-region is assigned z-value "10" (as a result of appending a "0" to the base z-value "1"). The left upper z-region is assigned z-value "01", and the right upper z-region is assigned z-value "11". Another vertical split is performed to subdivide the z-regions at z-level 2 into respective two halves to provide 8 z-regions at z-level 3. Again, a "0" or "1" value is appended to the z-value of each of the split z-regions. This decomposition process continues until a termination criterion is met.

Some z-values at the different z-levels are duplicated. For example, the value zero occurs four times in the example of FIG. 2: 0 (at z-level 0), 0 (at z-level 1), 00 (at z-level 2), and 000 (at z-level 3). Duplication of z-values can present problems when performing joins of spatial objects at multiple z-levels. To avoid this problem, unique z-cell numbers are assigned to each z-region or z-cell, as shown on the right-hand side of FIG. 2.

Because there are duplicate z-values at different levels of the z-ordered data structure, a unique z-cell identifier or number is created to facilitate database system operations. The unique z-cell identifier is created by encoding the level within the z-value. A z-cells value represents an area of space that contains and is contained by other z-cell values. z-cells contained by a given z-cell value are called the lower hull. Z-cells containing a given z-cell value are called the upper hull.

Z-regions are assigned integer values using the following formula:

$$z\text{-cell}=(\text{extended } z\text{-value}*F)+\text{Level},$$

where "extended z-value" represents the z-value assigned at the left-hand side of FIG. 2, Level represents the z-level the z-region is at (e.g., 0, 1, 2, . . . ), and F is defined as follows:

$$F=\min(n=0, 1, 2, \ldots ) \text{ where } 2^n > L_M,$$

where $L_M$ is the maximum z-value length (representing the number of bits in the z-value). The length of a z-value is also the z-level of the z-region. Thus, in the example of FIG. 2, $L_M$ is equal to 3.

Figure 3:
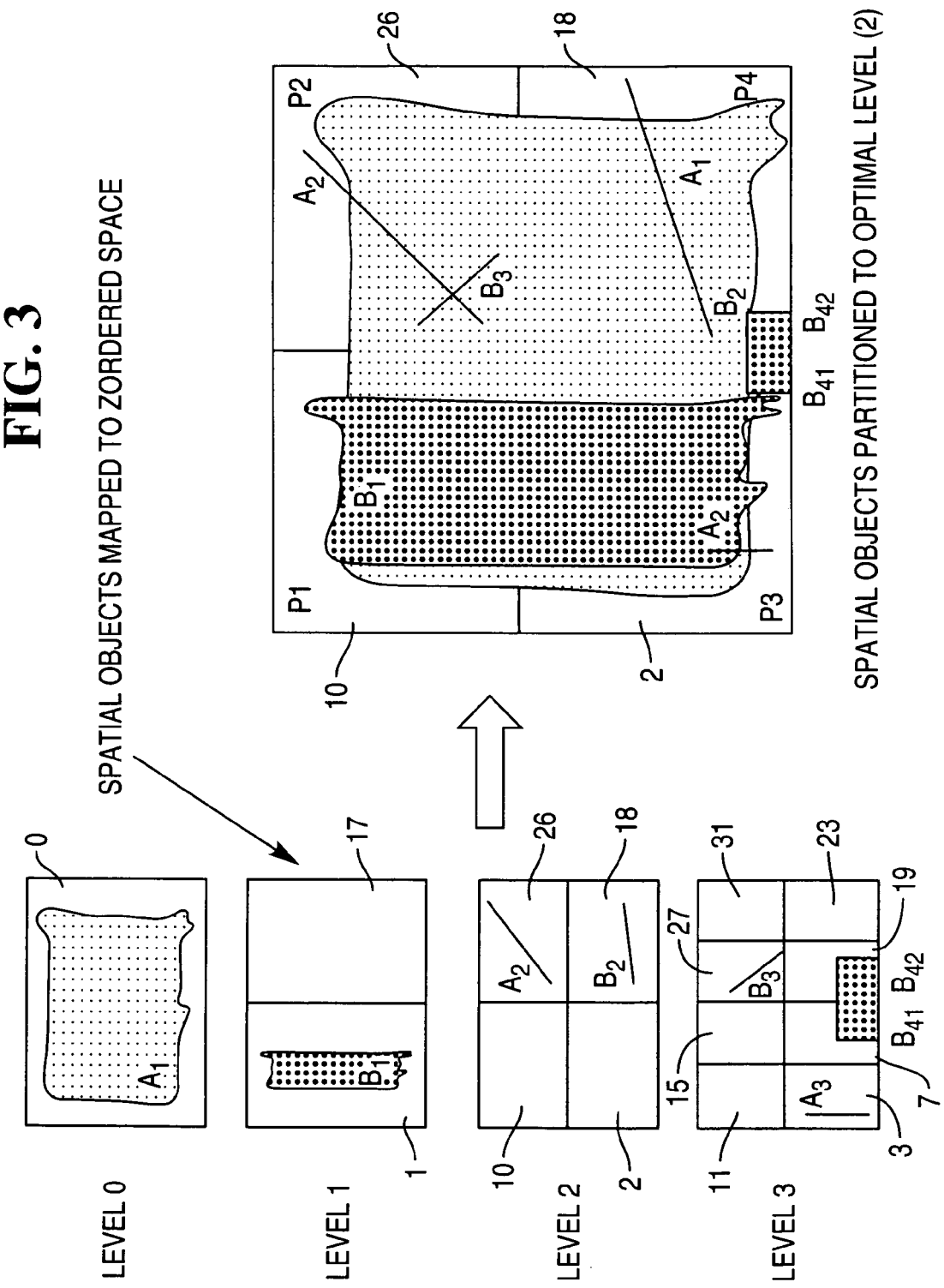

FIG. 3 shows the mapping of spatial objects to z-ordered space. It is assumed that there are two tables A and B. A has rows with spatial objects A1, A2, and A3, and B has rows with spatial objects B1, B2, B3, and B4. Spatial object A1, which represents the map of the entire United States, is contained within a z-cell 0 at z-level 0. Spatial object B1, which represents a western region of the United States, is stored within the z-cell 1 at z-level 1. Spatial objects A2 and B2 are completely contained within respective z-cells 26 and 18 at z-level 2. Spatial objects A3 and B3 are contained within two respective z-cells 3 and 27 at z-level 3. Spatial object B4 is split across two z-cells 7 and 19 at z-level 3.

A "lower hull," $z_L$, also referred to as the cells descendant interval, is defined as follows:

$$z_L = \{z\text{-cello}, z\text{-cellhi}\},$$

where z-cello=z-cell, and
z-cellhi=z-cell+$(2^{(L_M - z\text{-cell.level})} * F) - (z\text{-cell.level}+1)$.

The value z-cell.level represents the z-level which the z-cell is at. The parameter z-cellhi is the maximum numbered element in the lower hull. Thus, in the example of FIG. 2, the z-cell 1 is associated with a lower hull {1, 15}, where z-cello=1 and z-cellhi=15.

Thus, a z-region or z-cell represents an area of space covered by the cells descendant interval (or more simply, interval). In the example of FIG. 2, the z-cell 1 at z-level 1 represents an area of space covered by interval 1-15 (including z-cell 1 at z-level 1, z-cells 2 and 10 at z-level 2, and z-cells 3, 7, 11, and 15 at z-level 3). Likewise, z-cell 2 at z-level 2 represents an area of space covered by the interval 2-7.

The upper hull, $z_H$, also referred to as the cells ancestor, is defined as $$z_H = z\text{-value} >> (L_C - L_R),$$

where the symbol ">>" represents a bitwise right shift operator that shifts a string of bits to the right by the specified number of positions $(L_C - L_R)$, $L_R$ is the arbitrary z-level at which the upper hull is determined, and $L_C$ is the z-cells level, defined as follows:

$$L_C = z\text{-cell modulus } F.$$

Put another way, given a z-value Z in 01-representation (e.g., 010), all z-values Z' prefixed by Z are in the lower hull (or interval). The z-values Z' are at or below the z-level of the given z-value Z. All z-values Z" prefixing Z are in the upper hull. Geometrically, given a z-region Z, every z-region Z" in the upper hull encloses the z-region Z, and every z-region Z' in the lower hull is enclosed by the z-region Z.

A cells hull closure, $z^+$, is obtained as follows:

$$z^+ = z_L \cup z_H.$$

The hull closure consists of a set of z-cell intervals that represent the upper and lower hulls of the z-cell.

To compare the intersection of a z-ordered set A (table A) and another z-ordered set B (table B), one or more of the following expressions are computed:

$A \cap B^+ \neq \emptyset$ (A intersects hull of B);

$A^+ \cap B \neq \emptyset$ (B intersects hull of A);

$A_L \cap B_L \neq \emptyset$ (lower hull of A intersects lower hull of B);

$A_H \cap B_H \neq \emptyset$ (upper hull of A intersects upper hull of B).

In accordance with some embodiments of the invention, a mechanism is provided for partitioning z-ordered spatial data that efficiently supports a partitioned join execution environment. Since sets of spatial objects are approximated by z-cells of variable size, spatial partitioning and spatial comparisons cannot simply be made based on z-cell number values. Z-cell numbers in this context represent containment or enclosure relationships. For partitioning and comparison, z-cell intervals that represent the cells spatial coverage are used.

To perform a z-ordered join in a partitioned environment, the partitioning algorithm ensures that all possible overlapping intervals are co-located to the same partition. A "partition" refers to a module, such as the access module 18, in which a join operation can be performed concurrently with other modules. For example, the database system 10 having N access modules 18 that can perform concurrent joins is said to have N partitions. One possible approach for a partitioned environment may be to duplicate all join-input data (the spatial objects stored in tables to be joined) to all partitions. However, this is expensive in terms of the number of rows that must be duplicated and in the number of join comparisons that must be performed. An alternative approach is to enumerate the z-ordered intervals of the join-input data and partition on the enumerated z-regions. This entails dividing an object into multiple z-regions and redistributing the multiple z-regions to corresponding multiple access modules 18. The enumeration process is also an expensive operation if applied to all spatial objects.

In accordance with some embodiments, a partitioned z-ordered join mechanism considers z-ordered space as a multi-level data structure (such as the multiple z-levels shown in FIGS. 2 and 3). Each z-level of the data structure contains some number of spatial objects. Thus, in FIG. 3, z-level 0 includes spatial object A1, z-level 1 includes spatial object B1, z-level 2 includes spatial objects A2 and B2, and z-level 3 includes spatial objects A3, B3, $B4_1$, and $B4_2$. The number of spatial objects at each z-level is a function of the data demographics.

Figure 4:
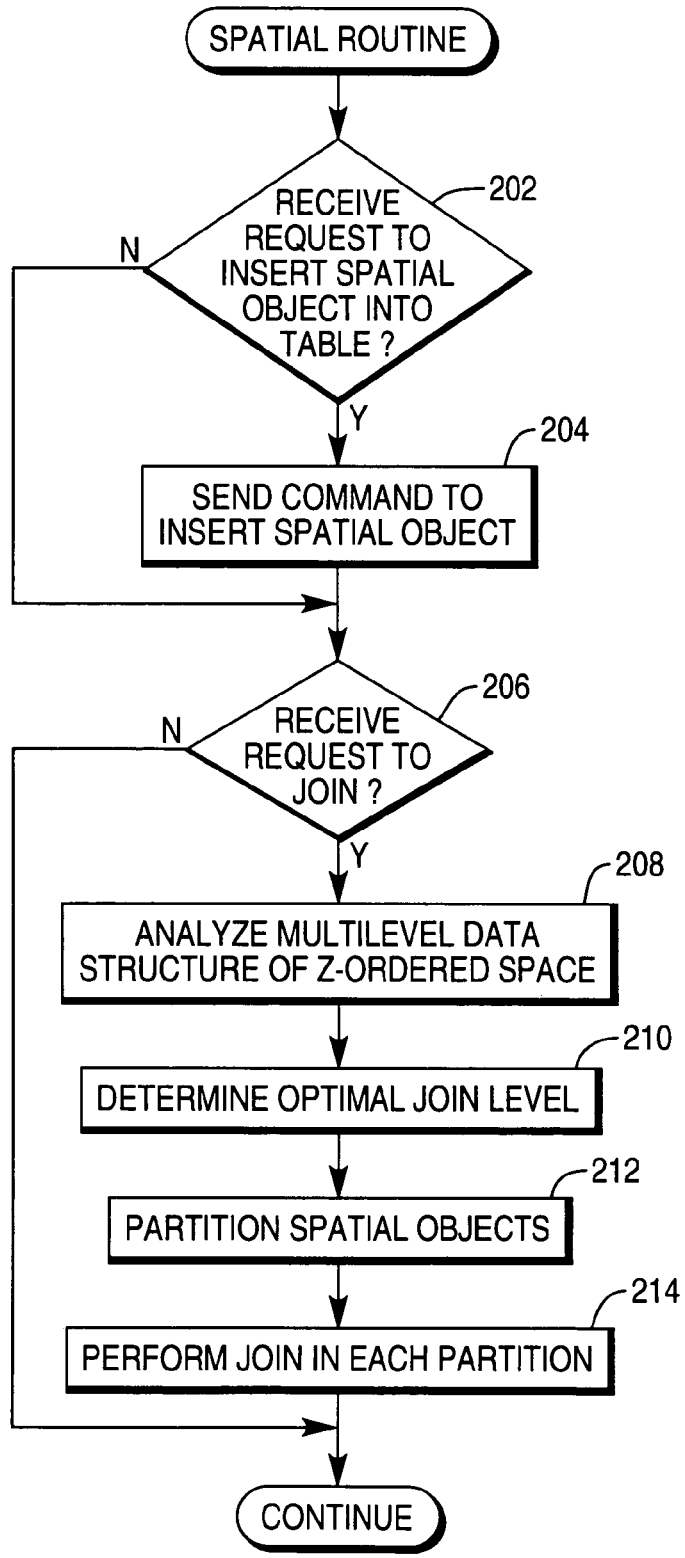
FIG. 4 is a flow diagram of a process of storing z-ordered spatial objects and performing a partitioned z-ordered join.

As shown in FIG. 4, in response to receiving (at 202) a query to insert spatial object(s) into a table A, the parsing engine 24 (FIG. 1) sends (at 204) commands or instructions to one or more access modules 18 to insert the spatial object(s) into the table A. The spatial routine 26 in the parsing engine 24 performs z-ordering to decompose each spatial object into a z-regions that represent the spatial object. Information representing the z-regions along with information representing the spatial object are stored by the access modules 18 into respective portions of the table A in respective storage modules 20. If the database system has plural parsing engines, then certain of the acts discussed in connection with FIG. 4 can be performed in parallel.

Subsequently, the parsing engine 24 receives (at 206) a query to join table A with another table (e.g., table B). Note that the spatial objects in tables A and B are likely represented by z-cells located at different z-levels, such as in the example of FIG. 3. By analyzing (at 208) the z-level demographics of the spatial objects of tables A and B, the spatial routine 26 determines (at 210) an optimal join level (OJL) that minimizes the number of rows that are partitioned and the number of join comparisons that are performed. The optimal join level defines the z-level in z-ordered space that establishes a normalized z-region size for performing partitioning (duplicating spatial objects and/or redistributing z-cells across multiple access modules 18) to enable a partitioned z-ordered join operation. Once the optimal join level is selected, the multi-leveled z-ordered data structure is effectively collapsed to a single z-level—the optimal join level.

In one embodiment, the optimal join level is also the optimal partition level (OPL). The optimal partition level is the level of the z-ordered data structure used to facilitate partitioning of objects in the input data sets. In other embodiments, the optimal partition level is different from the optimal join level.

In the ensuing description, partitioning of spatial objects is discussed in relation to the optimal join level because it is assumed that the optimal partition level is the same as the optimal join level. If the levels are not the same, however, then the partitioning of spatial objects is based on the relationship of each spatial object to the optimal partition level. Note that partitioning of spatial objects across plural partitions is based on characteristics of the spatial objects (e.g., their relationship to the optimal partition level) rather than the characteristics of the tables containing the spatial objects.

The spatial routine 26 uses a cost-based analysis (at 212) to make decisions on z-cell interval duplication versus enumeration for z-cells at z-levels above the optimal join level. Duplicating a spatial object involves copying the spatial object to each and every partition (or access module 18 in the example database system 10 of FIG. 1). Enumerating a spatial object involves representing the spatial object as multiple z-cells at the optimal join level and redistributing the multiple z-cells (at the optimal join level) representing the spatial object among the multiple partitions. Z-cells at or below the optimal join level can simply be partitioned on the optimal join level z-cell number and redistributed. The spatial object's z-cell number is used for overlap comparison during the partition-based z-ordered merge process. This is enabled by the contains/containment relationships of z-cells at the optimal join level and spatial object z-cells. Four partitioning cases are considered for partitioning z-cells of a spatial object.

The spatial routine 26 evaluates the four possible partitioning cases for a given z-cell. In case 1, z-cells M (with M being a predefined number) or more levels above the optimal join level are duplicated to all partitions. These z-cells have large intervals and would result in $2^{(OJL-level\ of\ z-cell)}$ z-cells at the optimal join level. Consequently, these z-cells are too costly to enumerate. After projecting to the optimal join level, each of these z-cells have non-zero length interval. An example of this case is object A1 in FIG. 3, where the optimal join level is z-level 2. Object A1 is represented by z-cell 0 at z-level 0, which is 2 levels (assume M=2) above the optimal join level. Z-cell 0 at z-level 0 has a non-zero length in that z-cell 0 represents an area covered by the interval {0, 31}.

In case 2, z-cells that are less than M levels above the optimal join level have their intervals enumerated and partitioned at the optimal join level. These cells have zero length intervals at the optimal join level. An example is object B11 in FIG. 3, which is at z-level 1. Thus, at the optimal join level, object B1 is represented by z-cells 2 and 10. A consequence of collapsing the multi-leveled data structure to the optimal join level is that z-cells that are less than M levels above the optimal join level, or which are at or below the optimal join level, no longer represent intervals but are rather reduced to a single value. In other words, z-cells 2 and 10 representing spatial object B1 at the optimal join level do not represent intervals from the perspective of the multi-leveled data structure. Instead, z-cells 2 and 10 are said to be zero-length intervals, that is, intervals where z-cello is equal to z-cellhi.

In case 3, z-cells at the optimal join level are left in place. These z-cells have zero-length intervals at the optimal join level. Examples of these are objects A2 and B2 in FIG. 3. The z-cells representing these objects are simply redistributed (without enumeration).

In case 4, z-cells below the optimal join level are partitioned based on their upper hull cell number at the optimal join level. These cells have zero length intervals at the optimal join level. Examples of these are objects A3, B3, B4$_1$, and B4$_2$ in FIG. 3. Thus, the object A3 is represented by z-cell 2 at the optimal join level instead of z-cell 3 at z-level 3. Similarly, object B4$_1$ is represented by z-cell 2 at the optimal join level, object B4$_2$ is represented by z-cell 18 at the optimal join level, and object B3 is represented by z-cell 11 at the optimal join level. Again, the z-cells representing these objects are simply redistributed.

After partitioning of the spatial objects (at 212), a join is performed in each of the multiple partitions (at 214).

The characteristics of each of the spatial objects in tables A and B in the example of FIG. 3 are summarized below:

| Spatial Object | Z-Cell | Partitioning Case | Partitioning Z-Cell |
| --- | --- | --- | --- |
| A1 | 0 | 1 | NA (Duplicated to All AMPs) |
| A2 | 26 | 3 | 26 |
| A3 | 3 | 4 | 2 |
| B1 | 1 | 2 | 2, 10 |
| B2 | 18 | 3 | 18 |
| B3 | 27 | 4 | 26 |
| B4$_1$ | 7 | 4 | 2 |
| B4$_2$ | 19 | 4 | 18 |

The first column identifies the spatial object. The second column indicates the z-cell number of the z-region containing the spatial object. The third column indicates which one of the four cases the spatial object falls under. The fourth column indicates the z-cell number(s) at the optimal join level of the z-cell(s) containing the spatial object.

Thus, for example, spatial object A1 is associated with z-cell 0 (at z-level 0), which falls under case 1 (and thus is not represented by z-cells at the optimal join level. The spatial object A1 is duplicated to all AMPs. Spatial object B1 is associated with z-cell 1 (at z-level 1), falls under case 2, and is contained in z-cells with numbers 2 and 10 at the optimal join level.

Before merging tables A and B, the rows of table A are sorted by z-cello and z-cellhi as follows:

| Row | Z-celllo | Z-cellhi |
| --- | --- | --- |
| A1 | 0 | 32 |
| A3 | 2 | 2 |
| A2 | 26 | 26 |

The rows of table B are sorted by z-cello and z-cellhi as follows:

| Row | Z-celllo | Z-cellhi |
| --- | --- | --- |
| B1 | 2 | 2 |
| B4$_1$ | 2 | 2 |
| B1 | 10 | 10 |
| B2 | 18 | 18 |
| B4$_2$ | 18 | 18 |
| B3 | 26 | 26 |

Note that the sorting illustrated above assumes that the objects are all stored on one partition. If they are stored across multiple partitions, the sorting by z-cello and z-cellhi is performed in each partition independently. Sorting by z-cello and z-cellhi in this context means that objects are sorted according to their associated z-cello value. If the z-cello values of two objects are equal, then the sorting is performed according to z-cellhi.

Figure 5:
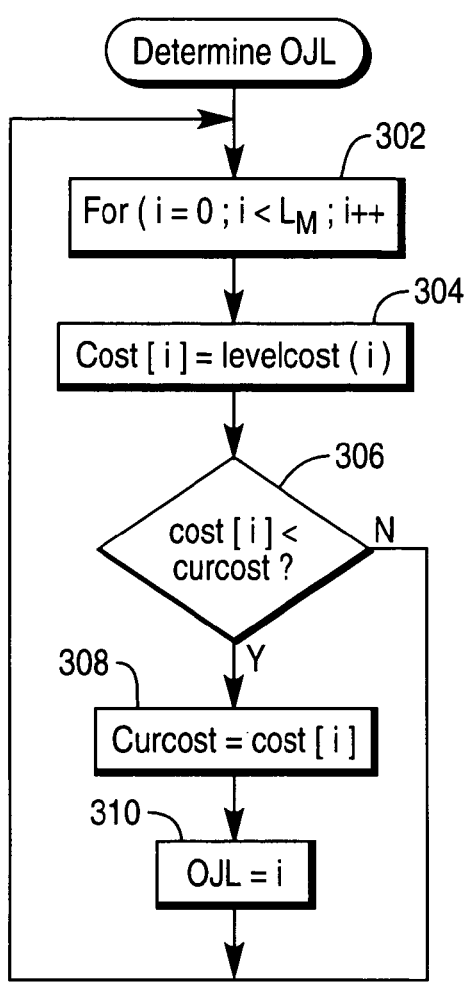
FIGS. 5 and 6 are flow diagrams of a process of determining an optimal join level for the partitioned z-ordered join.
Figure 6:
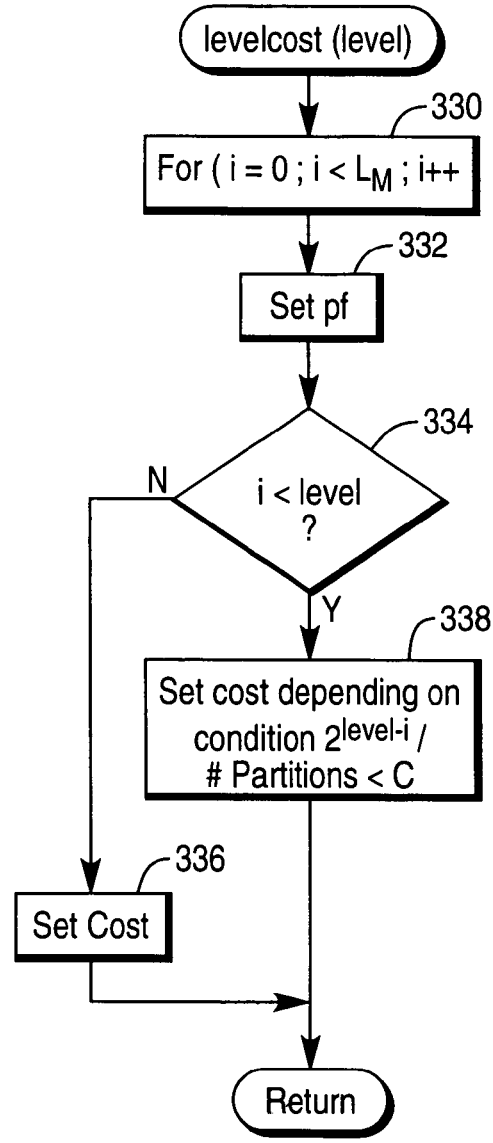

The process for identifying the optimal join level is illustrated in FIGS. 5 and 6. As noted above, the spatial routine 26 performs a cost-based analysis (210 in FIG. 4) to determine which z-level is the optimal join level. The cost-based analysis is enabled with a data structure, which provides the demographics of the number of spatial objects per z-level. The basis of a level's cost is the number of input rows that have to be duplicated, enumerated or redistributed if this level is chosen as the OJL. The costing also includes factors to ensure that parallel efficiency is achieved through minimizing skew. Skew occurs if uneven distribution of z-cells to the plural access modules 18 occurs.

The spatial routine 26 performs (at 302) an iterative process that loops through values of i from 0 to a value less than $L_M$, where $L_M$ is the maximum z-value length (or z-level), discussed above. A parameter cost[i] is set equal (at 304) to levelcost(i), where levelcost( ) is a routine that is invoked by the spatial routine 26 to calculate the cost for a given z-level i. The spatial routine 26 determines (at 306) if cost[i] is less than the current cost, stored in curcost. If so, the current cost, curcost, is set equal to cost[i] (at 308). The optimal join level, OJL, is then set equal to i (at 310). This process is repeated until all z-levels have been accounted for.

FIG. 6. shows the process performed by the levelcost (Level) routine, where Level represents the current z-level that the routine is to calculate the cost for. The levelcost( ) routine performs an iterative process (at 330) for a value of i that starts at 0 and ends at a value less than $L_M$. A parallel efficiency factor, pf, is set as follows:

$$pf=1; \text{ if } (2^i<\text{\#partitions})pf=\text{\#paritions}/2^i,$$

where the value #partitions represents the number of partitions (or access modules 18) in the database system 10. The value of pf is set to favor lowered number z-levels as the optimal join level to avoid skew.

Next, the levelcost( ) routine determines (at 334) if i is less than Level (representing the current z-level that the routine is to calculate the cost for). If not (that is, the value of i is greater than or equal to Level), the levelcost( ) routine sets the value of cost (at 336) according to the following formula:

$$cost=cost+\{A.\text{numobjects}[i]+B.\text{numobjects}[i]\}*pf.$$

The value of i being greater than or equal to Level represents z-levels that are at or below the current z-level—note that 0 represents the highest z-level while $L_M$ represents the lowest z-level. In the above equation, cost is set equal to the current value of cost plus the number of z-cells representing objects in table A at level i (A.numobjects[i]) plus the number of objects in table B that are at z-level i (B.numobjects[i]), with the sum of A.numobjects[i] and B.numobjects[i] multiplied by the parallel efficiency factor pf. This summation represents the cost of redistributing the objects at z-level i, where i is at or below the level being evaluated.

If the levelcost( ) routine determines (at 334) that i is less than Level, then the levelcost( ) routine sets (at 338) the value of cost depending on the following condition: $2^{Level-i}/\text{\#partitions}<C$, where C is a predefined constant. If $2^{Level-i}/\text{\#partitions}<C$ is false, then that indicates that the z-level i is M or more levels above the optimal join level (which in this case is assumed to be the z-level Level). This indicates case 1 above is true, which means that the object is duplicated to all partitions. In this case, the value of cost is set according to the following formula:

$$cost=cost+(A.\text{numobjects}[i]+B.\text{numobjects}[i])*\text{\#partitions}*pf.$$

In the above equation, the value of cost is set equal to the current value of cost plus the cost associated with duplicating the number of objects in table A and the number of objects in table B across multiple partitions, scaled by the value pf.

If $2^{Level-i}/\text{\#partitions}<C$ is true, then case 2 is applicable, in which case the spatial object is enumerated and redistributed to the multiple partitions. In this case, the cost is set according to the following formula:

$$cost=cost+(A.\text{numobjects}[i]+B.\text{numobjects}[i])*2^{Level-i}*pf.$$

Figure 7:
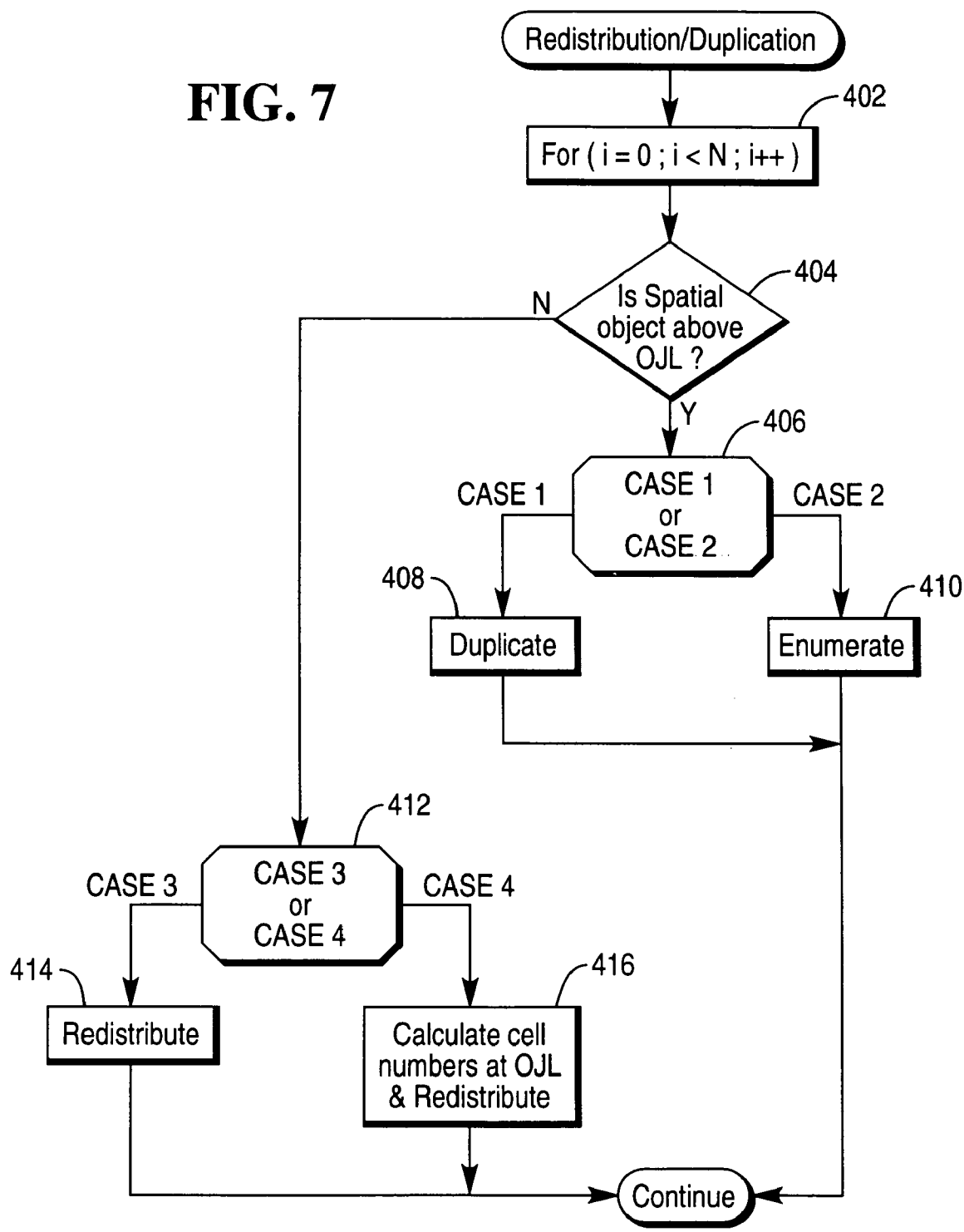
FIG. 7 is a flow diagram of a process of determining if spatial objects involved in the partitioned z-ordered join are to be duplicated or enumerated.

FIG. 7 shows the process of duplicating, enumerating, or redistributing spatial objects in the four different cases (case 1, case 2, case 3, and case 4), with each spatial object processed iteratively (at 402) for a value of i from 0 to N−1. This process is the process of partitioning the rows of each table across the multiple access modules 18. Ar represents a row in table A. Ars represents a spatial attribute in row Ar. Arsc[0 . . . N] represents an array of all the z-cells that represent the spatial attribute of row Ar in support of multiple assignment (plural z-cells representing one spatial object).

The spatial routine 26 determines (at 404) if the z-cell represented by Arsc[i] is above the optimal join level. This is performed by checking if the following condition is true: Arsc[i] % F>OJL. Arsc[i] % F means Arsc[i] modulus F. If the condition Arsc[i] % F>OJL is true, then the z-cell represented by Arsc[i] is above the optimal join level. Next, the spatial routine 26 determines (at 406) which case the z-cell falls into, case 1 or case 2. This is performed by checking for the following condition:

$$2^{Arsc[i] \% F-i}/\text{\#partitions}<C.$$

If the condition ($2^{Arsc[i] \% F-i}/\text{\#partitions}<C$) is true, then case 2 is indicated; otherwise, case 1 is indicated. For case 1, the entire spatial object (Ar) is duplicated (at 408). For case 2, the z-cell at the level for which its spatial object Ar is represented is expanded (at 410) to z-cells at the optimal join level. In the example of FIG. 3, such an object would be B1, which is represented by z-cells 2 and 10 at the optimal join level (z-level 2). The expanded z-cells are then redistributed to the appropriate partitions.

If it is determined (at 404) that the spatial object is not above the optimal join level, then the spatial routine 26 determines (at 412) whether case 3 or case 4 is applicable. This is performed by checking the condition Arsc[i] % F>OJL. If the condition Arsc[i] % F>OJL is true, case 4 is indicated; otherwise, if the condition Arsc[i] % F>OJL is false, case 3 is indicated. If case 3 is indicated, then that means that the spatial object (Ar) is already at the optimal join level, so that the z-cells representing the spatial object are redistributed (at 414) to the different partitions. However, for case 4, the z-cells containing the spatial object under consideration are below the optimal join level. As a result, the ancestors of such z-cells at the optimal join level have to be determined (at 416), with the ancestor z-cells redistributed across the partitions.

The partitioned z-ordered merge join process is based on an algorithm in Jack A. Orenstein et al., "PROBE Spatial Data Modeling and Query Processing in an Image Database Application," IEEE Transactions on Software Engineering, Vol. 14, No. 5, pp. 611-629 (May 1998), which is relevant for a non-parallel environment. Orenstein et al is deficient for the parallel environment because it does not define a data partitioning step and it does not address the parallel join issue of duplicate avoidance, false hit avoidance or efficient zero-length interval joins. The following describes an enhancement of the Orenstein et al. algorithm with solutions for these deficiencies.

Figure 8:
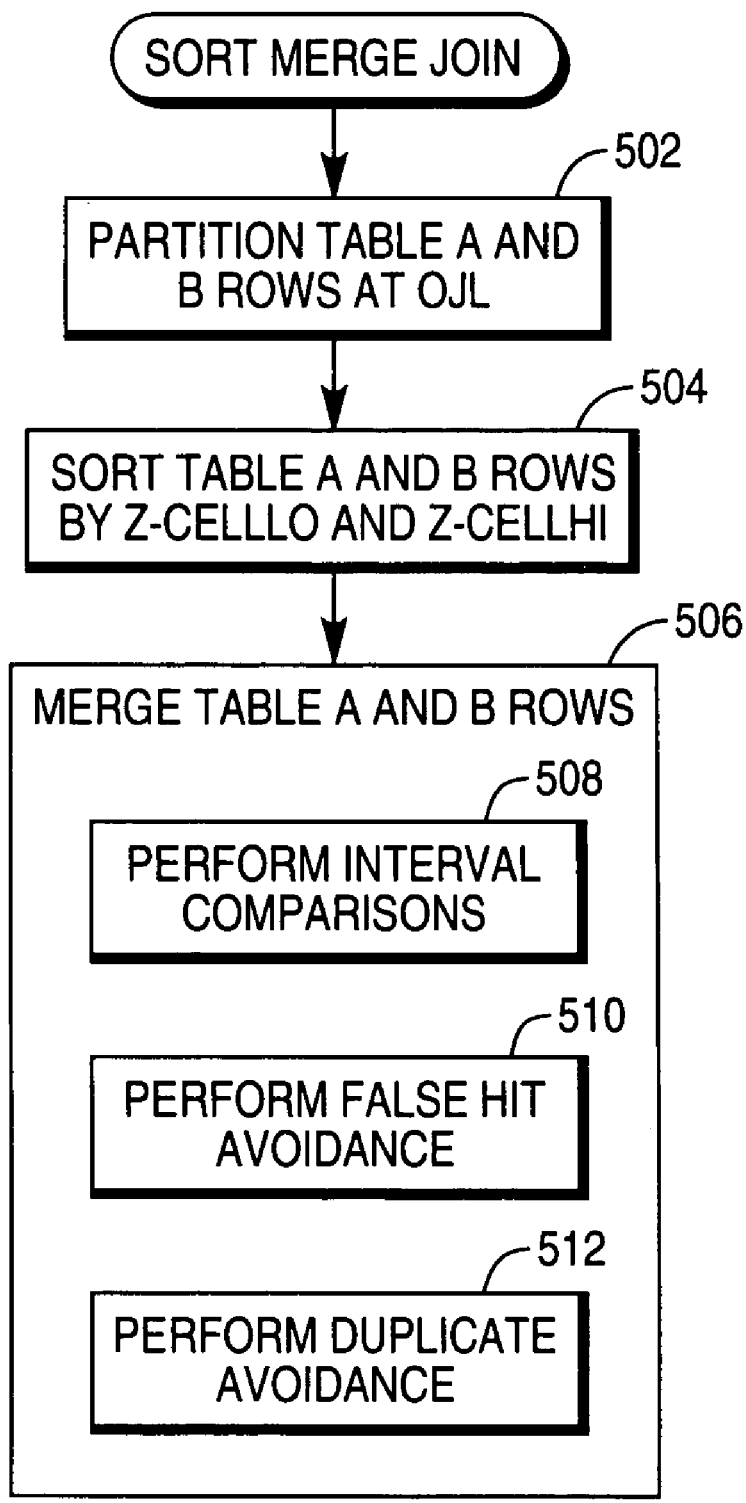
FIG. 8 is a flow diagram of a sort merge join process.

FIG. 8 shows the sort merge join process performed by the spatial routine 26. The table A and B rows are partitioned (at 502) at the optimal join level, as described in connection with FIG. 7. Next, the table A and B rows are sorted (at 504) by z-cello and z-cellhi in each partition. Then, in each partition, the table A and B rows are merged (at 506). Note that the merge is performed concurrently in the multiple partitions (or access modules 18). In merging the table A and B rows, interval comparisons are performed (at 508). In performing the merge, the spatial routine 26 also performs false hit avoidance (at 510). False hits can occur when partitioning z-cells from a lower resolution to a higher resolution. Therefore, to prevent this, false hit avoidance is performed. Also, duplicate avoidance is performed (at 512). Duplicates are caused by multiple assignment, and the partitioning scheme: the duplicate form of partitioning (case 1) and enumeration (case 2).

In the context of the FIG. 3 example, the various join result pairs are as follows (if false hit avoidance and duplicate avoidance are not performed): {A1, B1}; {A1, B4$_1$}; {A1, B4$_2$}; {A1, B1}; {A1, B2}; {A1, B3}; {A3, B1}; {A3, B4$_1$}; {A2, B3}.

In the search result pairs, the pair {A3, B4$_1$} is a false hit. Looking at FIG. 3, the objects A3 and B4$_1$ do not overlap. However, because the spatial object B4$_1$ is at a z-level below the optimal join level, the spatial object B4$_1$ is represented by z-cell 2 at the optimal join level. Similarly, spatial object A3, which is at a z-level below the optimal join level, is represented by z-cell 2 at the optimal join level. As a result, in performing the merge join, an interval comparison of the spatial objects A3 and B4$_1$ indicates a hit (z-cell 2 overlaps z-cell 2 at the optimal join level), when in fact A3 and B4$_1$ do not overlap.

Also, in the join result pairs listed above, the pair {A1, B4$_2$} is a duplicate of {A1, B4$_1$}, because B4$_1$ and B4$_2$ represent the same spatial object. Also, the second occurrence of {A1, B1} is a duplicate that is eliminated. With false hit avoidance and duplicate avoidance performed, the join result pairs are as follows: {A1, B1}; {A1, B4$_1$}; {A1, B2}; {A1, B3}; {A3,B1}; {A2,B3}.

The following describes the interval join process (performed at 508 in FIG. 8). Assume two tables A and B with z-valued attributes A.a and B.b. The spatial join is defined as follows:

A ⋈ $_{A.a\ between\ B.b\ and\ B.bhigh\ OR\ B.b\ between\ A.a\ and\ A.ahigh}$ B.

The predicate condition above evaluates the overlap relationship of elements in each input set A and B. In one embodiment, a first-in-first-out (FIFO) data structure (or stack) is used to nest rows that are in the current join interval of interest. Let A$_s$ denote the stack for A, and B$_s$ denote the stack for set B.

Figure 9:
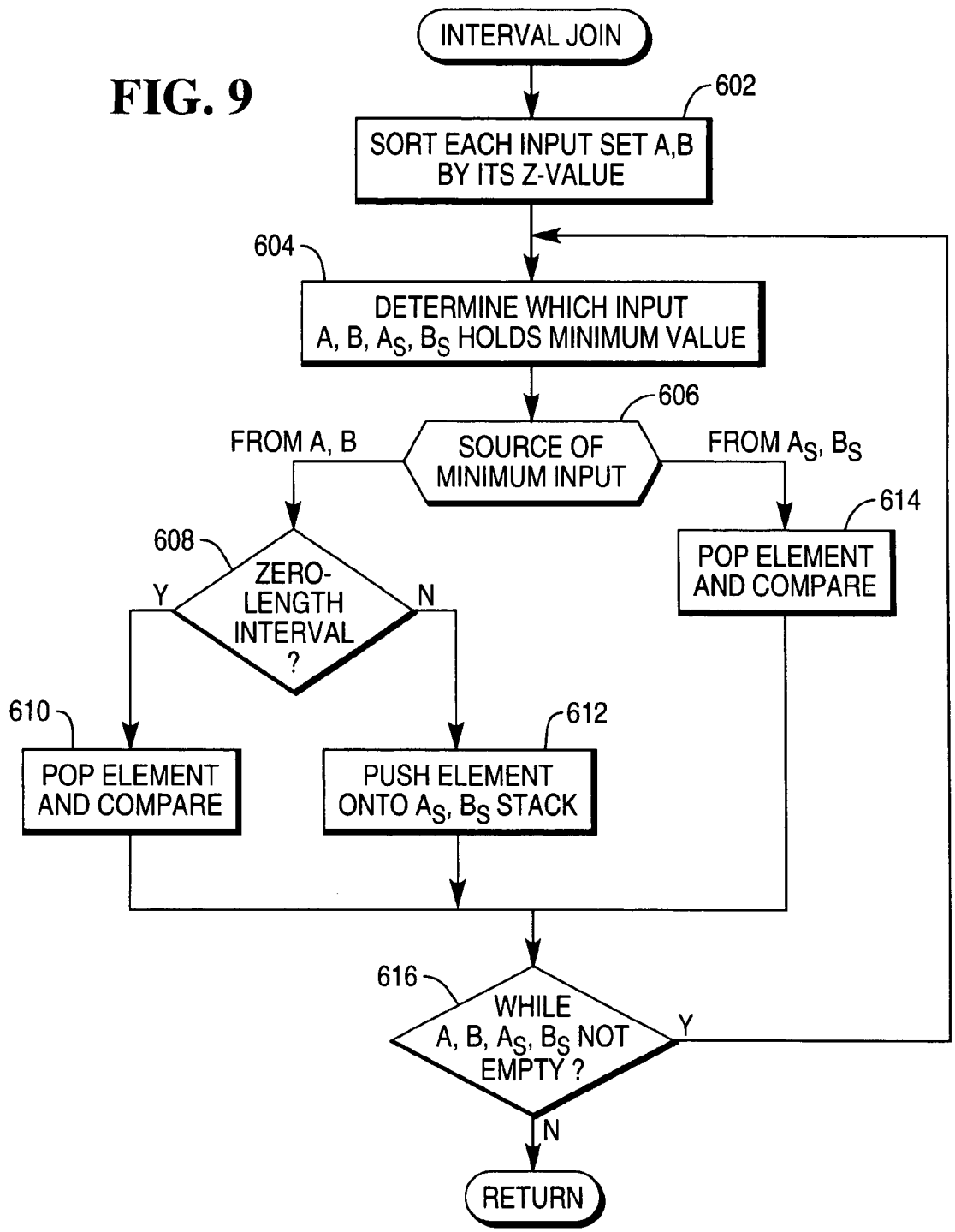
FIGS. 9-11 are flow diagrams of processes performed in the sort merge join process of FIG. 8.

The interval join process is illustrated in FIG. 9. First, each input set A, B is sorted (at 602) by its z-value A.a, B.b. The inputs to the merge join include A, B, A$_s$, B$_s$. The routine determines (at 604) which input A, B, A$_s$, B$_s$ holds the minimum z-value. Note that the stacks A$_s$ and B$_s$ are initialized with an element that represents the entire space. If the minimum input comes from set A or set B (as determined at 606), then the routine determines (at 608) if the element is a zero-length interval. If not, then the element is pushed onto the respective A$_s$, B$_s$ stack (at 612). However, if the element is a zero-length interval, then the top of the A$_s$ or B$_s$ stack is popped (at 610) and joined with all elements of the other A$_s$, B$_s$ stack. Note that the pushing of an element onto the A$_s$, B$_s$ stack is performed by calling a routine enter-element(X, Y), where X represents set A or B and Y represents the other of set A or B. The popping of an element from a stack and the joining of the popped element with elements of the other stack is performed by calling a routine exit-element(X, Y, TIE), where TIE represents a condition where the lowest z-values of A and B are equal. The code for enter-element(X, Y) and exit-element(X, Y, TIE), according to one example embodiment, is shown in the Appendix.

Note that if an input element is a zero-length element, then the act of invoking enter-element(X, Y) routine to push the input element onto the respective stack is not performed—instead, the exit-element(X, Y, TIE) routine is called directly to perform the interval comparison. Pushing of elements onto the respective stack is not needed because z-cello is equal to z-cellhi in the zero-length interval.

If the minimum input comes from the A$_s$, B$_s$ stack (as determined at 606), then the exit-element(X, Y) routine is called to pop the input element (at 614) from the A$_s$, B$_s$ stack and joined with all elements on the other stack B$_s$, A$_s$.

The process performed at 604-614 is repeated while the input sequence A, B, A$_s$ and B$_s$ are all not empty (as determined at 616).

Figure 10:
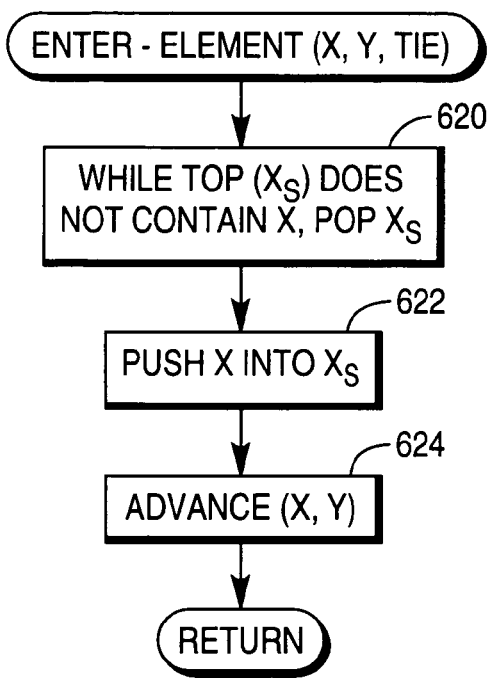

The enter-element(X, Y) routine is summarized in FIG. 10. If the element at the top of the X$_s$ stack, TOP(X$_s$), does not contain X (the input element), then the X$_s$ stack is popped (at 620). This is repeated to pop all elements of the X$_s$ stack that do not contain X. Next, the input element X is pushed into the X$_s$ stack (at 622). Then, a routine advance(X, Y) is called (at 624) to find the next relevant row in X given the current position in Y. This makes the interval matching more efficient since rows are skipped that will never match. The code for the advance(X, Y) routine, according to one example embodiment, is shown in the Appendix.

Figure 11:
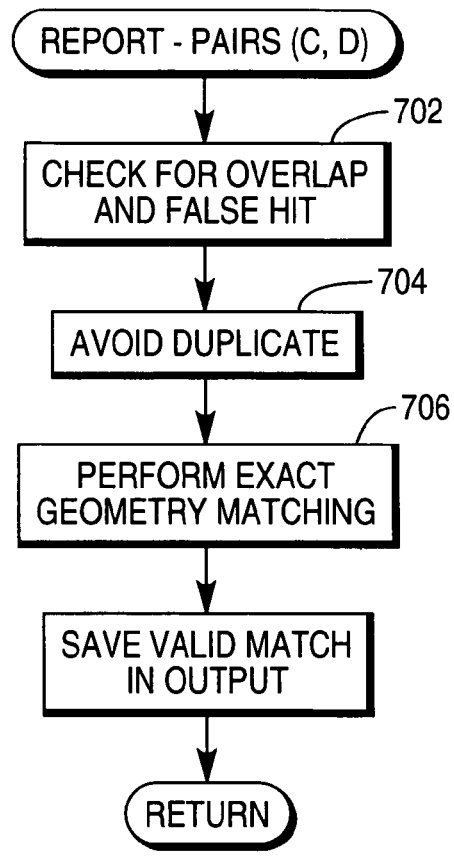

The exit-element (X, Y) routine that is called invokes a report-pairs(X,Y) routine, shown at FIG. 11. The report-pairs (X, Y) routine checks (at 702) for an overlap of X and Y by calling a overlap-cells(C, D) routine, where C is a first input corresponding to one of X and Y, and D is a second input corresponding to the other one of X and Y. The overlap-cells( ) routine also checks for false hits. False hits are join result rows that overlap at the optimal join level but not at rows of the original z-level. This situation arises when partitioning z-cells resident at lower resolution levels at the optimal join level. The false hit avoidance technique uses a bitwise XOR operation on the input z-value bit strings. The logic is as follows:

if (C.z-cell.level<D.z-cell.level)
  return ! (C.z-value^(D.z-value>>(D.z-cell.level−C.z-cell.level)))
else
  return ! (D.z-value^(C.z-value>>(C.z-cell.level−D.z-cell.level))), where C represents a first input (X, Y, X$_s$, Y$_s$) and D represents another one of X, Y, X$_s$, Y$_s$.

Next, the report-pairs( ) routine calls (at 704) an avoid-duplicates(C, D) routine (one example shown in Appendix) to avoid duplicate results. Duplicates are caused by size bound decomposition and by the duplicate form of partitioning. The avoid-duplicates(C, D) routine allows the skipping of a final global sort to eliminate duplicates, which can be time-consuming in a large database system. The basic idea is to assign each element of the result set to one partition using a unique point of the intersecting rectangle. For a pair of intersecting rectangles (C, D), the unique point (pt[0], pt[1]) is defined as follows. The coordinate of pt[0] is the maximum of the left edges of C and D, and the coordinate of pt[1] is the minimum of the upper edges of C and D. The join then only occurs in the partition that contains the defined unique point.

Next, the report-pairs( ) routine performs (at 706) exact geometry matching to ensure that spatial objects actually do overlap each other. Assuming that a false hit did not occur (702), a duplicate did not occur (704), and the exact geometry matching produces a valid result (706), the valid match is saved (at 708) in the output.

Instructions of the various software routines or modules discussed herein (such as the spatial routine 26; routines invoked by the spatial routine 26; the parsing engine 24; the access modules 18; and so forth) are stored on one or more storage modules in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

APPENDIX

```
Zlo = cell number or lower bound of the interval
Zhi = cell number of upper bound of the interval
Spatial merge join algorithm:
{
    A = left table sorted by (zlo, zhi)
    B = right table sorted by (zlo, zhi)
    A_S = Stack1            // FIFO data structure used to handle the interval
                                merging
    B_S = Stack2
    Push(A_S, Entire Space)    // Initialize A_S FIFO
    Push(B_S, Entire Space)    // Initialize B_S FIFO
    While(A not empty & B not Empty & A_S not empty & B_S not empty)
    {
        event = min-event (A.lo, A_S.hi, B.lo, B_S.hi, TIE)
        if A.lo = event
            if A.lo = A.hi & !TIE                    //
                exit-element(A, B, TIE)
            else
                enter-element(A, B)
        else if A_S.hi = event
            exit-element(A, B, FALSE)
        else if B.lo = event
            if B.lo = B.hi & !TIE                    //
                exit-element(B, A, TIE)
            else
                enter-element(B, A)
        else if B_S.hi = event
            exit-element(B, A, FALSE)
    }
}
    min-event(A, A_S, B, B_S, TIE) // Tie breaking order; A, B, A_S, B_S
    {
        if(A <= B & A <= A_S & A <= B_S)
        {
            if(A = B)
                TIE = TRUE
            return 1
        }
        if(B <= A_S & B <= B_S)
            return 2
        if(A_S < B_S)
            return 3
        return 4
```

APPENDIX-continued

```
}
enter-element(X, Y)                    // element enters the window of
                                       interest
{
    while(!contains(TOP(Xs), X)
            pop(Xs)
    push(Xs, X)
    advance(X,Y)
}
exit-element (X, Y, TIE)               // element exits the window of
                                       interest
{
    if (!TIE)
    {
        report-pairs(TOP(Xs), Ys)      // compare intervals and send matches to
                                       output
        pop(Xs)
    }
    else
        report-pairs(X, Ys)            // compare intervals and send matches to
                                       output
}
advance(X, Y)
/*
You could just sequence ahead to the next element in A/B but you can do much
better by skipping rows that will never match. The goal of advance is to find the
next relevant row in X given the current position in Y
*/
{
    /* This function searches the set X. The search starts from the current X
position + 1. It uses the current Y position as the search key.
    */
    K = Current Y         // Set search Key
    S = 'first element in X greater than or equal to K'
    if(contains(K, S))
            return S
    else
    {
        // step back one position and find largest containing element
        while(contains(S-1, K) || contains(K, S-1))
                S = S-1
    }
    return S
}
report-pairs(X, Y)
{
    if(!overlap-cells(X, Y))           //check for overlap and false hits.
            return
    if(avoid-duplicates(X, Y))         // Only join in one partition.
            return
    if(!overlap(X.points[ ], Y.points[ ]))    // Perform exact geometry matching
            return
    put-rows(X, Y)                     // A valid match, save in output
}
            overlap-cells(C, D)
            /* Compare z-values, bit strings, for overlap. Using the spatial object z-value
ensures there are no false hits. This operation handles zero and non-zero length intervals.
                Evaluation is performed using a bitwise XOR operator.
            */
            if(C.z-cell.level < D.z-cell.level)
                    return !(C.z-value ^ (D.z-value >> (D.z-cell.level - C.z-cell.level)))
            else
                    return !(D.z-value ^ (C.z-value >> (C.z-cell.level - D.z-cell.level)))
            }
            avoid-duplicates(C, D)
            {
                pt[0] = max(C.mbr[0], D.mbr[0]    // MBR (minimum bounding rectangle) is
                                                  for the spatial object, not just this cell.
                pt[1] = min(C.mbr[3], D.mbr[3]
                pz-cell = point-to-cell(pt);
                pzj-cell = ancestor (pz-cell, OJL);    // Calculate z-cell at OJL
                // Handle duplicates caused by duplicate form of partitioning - CASE 1
                if(CUR-AMP != hashamp(pzj-cell)        // Don't Join in this partition
                        return false
                // handle duplicates caused by size bound decomposition.
                if(C.z-cell.level < OJL)
                        if(pz-cell != C.z-cell)        // Don't join on this element
                                return false
                if(D.z-cell.level < OJL)
```

APPENDIX-continued

```
            if(pz-cell != D.z-cell)        // Don't join on this element
                return false
            return true
}
```

What is claimed is:

1. A method for use in a computer implemented relational database system to join spatial objects, the method comprising:

storing plural tables each containing spatial objects;

decomposing each of the spatial objects into z-cell subspaces according to z-ordering where each of the spatial objects is decomposed separately to a z-level specific to the characteristics of the spatial object;

distributing the subspaces across plural partitions;

identifying at least one of the levels as an optimal join level at which a join of the spatial objects of plural tables occurs;

duplicating a given z-cell of a spatial object to the plural partitions if the z-level of the given z-cell is at least a predetermined number of z-levels above the optimal join level and enumerating the given z-cell if the z-level of the given z-cell is less than the predetermined number of levels above the optimal join level;

executing, in parallel in the plural partitions, a join of the spatial objects of the plural tables; and returning the results of the join of the spatial objects.

2. The method of claim 1, wherein storing the plural tables containing spatial objects comprises storing the sets of z-cells, each set representing a spatial object.

3. The method of claim 2, wherein storing the sets of z-cells comprises storing the sets at plural z-levels.

4. The method of claim 3, further comprising identifying at least one of the plural z-levels as an optimal partition level at which partitioning of the spatial objects occurs.

5. The method of claim 4, wherein identifying the optimal partition level is based on a cost-based analysis.

6. The method of claim 5, further comprising performing the cost-based analysis by accumulating a count of a number of z-cells at each level.

7. The method of claim 3, further comprising identifying at least one of the plural z-levels as an optimal join level at which a join of spatial objects of plural tables occurs.

8. The method of claim 7, further comprising determining, based on the z-level a given z-cell of a spatial object is at, whether to duplicate the given z-cell or to enumerate the given z-cell into z-cells at a lower level.

9. The method of claim 8, further comprising duplicating the given z-cell to the plural partitions if the z-level of the given z-cell is at least a predetermined number of z-levels above the optimal join level and enumerating the given z-cell if the z-level of the given z-cell is less than the predetermined number of levels above the optimal join level.

10. The method of claim 1, further comprising using a cost-based analysis to, identify the optimal join level.

11. The method of claim 1, wherein enumerating the given z-cell comprises dividing the given z-cell, if the z-level is greater than the optimal join level, the given z-cell into corresponding z-cells at the optimal join level, the method further comprising redistributing the z-cells at the optimal join level and if the z-level of the given z-cell is less than the optimal join level, the ancestor z-cell at the optimal join level containing the given z-cell, the method further comprising redistributing the z-cell at the optimal join level.

12. The method of claim 1, wherein performing the join of the spatial objects comprises performing joins of z-cells based on comparisons of intervals of z-cells at the optimal join level representing the spatial objects on each partition.

13. The method of claim 12, further comprising performing false hit avoidance to avoid false hits due to comparisons performed at the optimal join level.

14. The method of claim 12, further comprising performing duplicate avoidance.

15. The method of claim 12, further comprising defining a z-cell less than the predetermined number of levels above the optimal join level, at the optimal join level, or below the optimal join level as having a zero-length interval, the method further comprising optimizing the join for zero-length interval z-cells.

16. The method of claim 12, further comprising defining a z-cell at least at the predetermined number of levels above the optimal join level as having a non-zero-length interval containing z-cells at the optimal join level.

17. The method of claim 1, further comprising reducing skew in dividing the spatial objects across multiple partitions, and reducing duplication of objects to the multiple partitions to enhance efficient parallel spatial join.

18. The method of claim 1, wherein dividing the spatial objects across plural partitions is based on characteristics of the spatial objects instead of characteristics of the tables.

19. The method of claim 18, further comprising identifying an optimal partition level, wherein dividing the spatial objects comprises performing one of duplication, enumeration, and redistribution based on a relationship of a spatial object to the optimal partition level.

20. A computer readable storage medium containing instructions that when executed by a computer cause a relational database system to:

represent the spatial objects as z-cells in z-ordered space at plural z-levels;

define one of the z-levels as an optimal join level;

distribute the z-cells representing the spatial objects of tables across plural partitions;

identify whether a given z-cell is at least a predetermined number of z-levels above the optimal join level; and duplicate the given z-cell to the plural partitions if the given z-cell is at least the predetermined number of z-levels above the optimal join level;

enumerate the given z-cell into z-cells at the optimal join level if the given z-cell is less than the predetermined number of z-levels above the optimal join level; and distribute the z-cells at the optimal join level across the plural partitions; and execute a join of the distributed z-cells in each partition at the optimal join level; and return the results of the join.

21. The storage medium of claim 20, wherein the instructions when executed cause the database system to further:

identify whether a given z-cell is at least a predetermined number of z-levels above the optimal join level; and duplicate the given z-cell to the plural partitions if the given z-cell is at least the predetermined number of z-levels above the optimal join level;

enumerate the given z-cell into z-cells at the optimal join level if the given z-cell is less than the predetermined number of z-levels above the optimal join level; and distribute the z-cells at the optimal join level across the plural partitions.

22. The storage medium of claim 20, wherein the enumerate step further comprises identifying an ancestor z-cell at the optimal join level containing the given z-cell.

23. The storage medium of claim 20, wherein the instructions when executed cause the database system to further identify one of the z-levels as an optimal join level and one of the z-levels as an optimal partition level, wherein performing the join is performed at the optimal join level, and wherein distributing the z-cells representing the spatial objects is based on a relationship of each spatial object to the optimal partition level.

24. The storage medium of claim 23, wherein the instructions when executed cause the database system to identify the optimal join level and the optimal partition level based on a cost analysis.

25. The storage medium of claim 20, wherein the instructions when executed cause the database system to further perform false hit avoidance and duplicate avoidance.

26. The storage medium of claim 25, wherein the instructions when executed cause the database system to further:

define certain of the z-cells as having a zero-length interval; and optimize the join for zero-length interval z-cells.

27. A computer implemented relational database system used to join spatial object, the system comprising:

a storage subsystem to store tables containing spatial objects;

a plurality of access modules to manage parallel access of respective portions of the storage subsystem; and a controller for:

decomposing each of the spatial objects into z-cell subspaces according to z-ordering where each of the spatial objects is decomposed separately to a z-level specific to the characteristics of the spatial object;

distributes z-cells of the spatial objects across the access modules by performing one of duplication, enumeration, and redistribution of each spatial object;

initiating a parallel join of the spatial objects by the plurality of access modules; and returning the results of the parallel join of the spatial objects.

28. The database system of claim 27, wherein the controller performs the parallel join of the z-cells at the optimal join level.

29. The database system of claim 28, wherein the controller:

identifies one of the z-levels as an optimal partition level; and distributes each spatial object across the plural access modules according to a relationship of the spatial object to the optimal partition level.

* * * * *